United States Patent [19]

Muller

[11] Patent Number: 4,711,021
[45] Date of Patent: Dec. 8, 1987

[54] METHOD OF INSTALLING A FEMALE ELEMENT TO A PANEL AND INSTALLATION APPARATUS

[75] Inventor: Rudolph R. M. Muller, Frankfurt, Fed. Rep. of Germany

[73] Assignee: Multifastener Corporation, Detroit, Mich.

[21] Appl. No.: 923,526

[22] Filed: Oct. 27, 1986

Related U.S. Application Data

[60] Continuation-in-part of Ser. No. 869,507, Jun. 2, 1986, which is a division of Ser. No. 657,570, Oct. 4, 1984, Pat. No. 4,610,072, which is a continuation-in-part of Ser. No. 563,833, Dec. 21, 1983, Pat. No. 4,555,838, which is a continuation-in-part of Ser. No. 504,074, Jun. 14, 1983, Pat. No. 4,543,701, which is a continuation-in-part of Ser. No. 229,274, Jan. 28, 1981, abandoned, said Ser. No. 563,833, is a continuation-in-part of Ser. No. 485,099, Mar. 28, 1983, Pat. No. 4,459,073, which is a division of said Ser. No. 229,274.

[30] Foreign Application Priority Data

Mar. 29, 1986 [DE] Fed. Rep. of Germany ....... 3610675

[51] Int. Cl.$^4$ .................. B23P 11/00; B23P 19/00
[52] U.S. Cl. ................................ 29/798; 411/179
[58] Field of Search .......... 29/432, 512, 432.1, 29/243.52, 432.2, 798, 21.1; 411/179

[56] References Cited

U.S. PATENT DOCUMENTS

| | | | |
|---|---|---|---|
| 3,213,914 | 10/1965 | Baumle et al. | 29/432 X |
| 3,405,436 | 10/1968 | Koett | 29/432.1 |
| 3,811,171 | 5/1974 | Grube | 29/432.2 X |
| 3,938,239 | 2/1976 | Lauth | 29/512 |
| 4,018,257 | 4/1977 | Jack | 29/512 X |
| 4,039,099 | 8/1977 | Boxall | 29/243.52 X |
| 4,064,617 | 12/1977 | Oaks | 29/798 X |
| 4,389,766 | 6/1983 | Capuano | 29/432.2 |
| 4,490,904 | 1/1985 | Moyher | 29/432 UX |

Primary Examiner—Charlie T. Moon
Attorney, Agent, or Firm—Cullen, Sloman, Cantor, Grauer, Scott & Rutherford

[57] ABSTRACT

A preceding or forward running former passing through a female fastener element during the attaching operation is proposed for a plunger and/or plunger/punch assembly which ensures that female fastener elements, especially nuts which are preferably of the self-piercing type, can be attached even to relatively thin sheets without any additional waste.

10 Claims, 4 Drawing Figures

METHOD OF INSTALLING A FEMALE ELEMENT TO A PANEL AND INSTALLATION APPARATUS

This application claims priority to German patent application No. P36 10 675.5, filed Mar. 29, 1986 and this application is a continuation-in-part application of U.S. Ser. No. 869,507, filed June 2, 1986, which application was a divisional application of Ser. No. 657,570, filed Oct. 4, 1984, now U.S. Pat. No. 4,610,072, issued Sept. 9, 1986, which application was a continuation-in-part application of Ser. No. 563,833, filed Dec. 21, 1983, now U.S. Pat. No. 4,555,838, which application was a continuation-in-part application of Ser. No. 485,099, filed Mar. 28, 1983, now U.S. Pat. No. 4,459,073, issued July 10, 1984, and Ser. No. 504,074, filed June 14, 1983, now U.S. Pat. No. 4,543,701, which applications were, respectively, divisional and continuation applications of Ser. No. 229,274, filed Jan. 28, 1981, now abandoned, which application claims priority to West German application No. 3003908, filed Feb. 2, 1980.

The present invention relates to a installation head assembly for attaching female fastener elements with piercing and riveting properties, especially piercing and riveting nuts, to a workpiece such as a panel, such installation head assembly being relatively movable to a die, preferably in a coaxial relation thereto, to thereby keep and guide said female element to be attached, and intended particularly for use in an apparatus of the type as described herein, and also to a type of die as preferably used which has an annular cavity on its working surface and a central bore or passage.

An apparatus of this type is illustrated and described in German laid-open print (Offenlegungsschrift) DE-OS No. 34 46 978, U.S. Ser. No. 657,570, filed Oct. 4, 1984, now U.S. Pat. No. 4,610,072, issued Sept. 9, 1986, and as outlined therein serves the purpose of attaching female fastener elements, especially nuts, to a panel; the method described in said publication can also be referred to as "prepierce riveting". It should be noted in this conjunction that while the allocation mentioned in the generic part of the main claim of plunger and punch is so illustrated in the drawings and described in the related specification of said DE-OS No. 34 46 978, U.S. Ser. No. 657,570, filed Oct. 4, 1984, now U.S. Pat. No. 4,610,072, issued Sept. 9, 1986, that plunger and punch move relative to each other, such relative movement is not absolutely necessary and these two elements can be provided in just one piece.

Even though the above mentioned method and the above mentioned apparatus have been found to produce top results, it may happen in fitting said female elements and/or nuts to relatively thin panels that additional panel material is wasted, i.e. that annular waste pieces are produced in addition to the pierced slug which could not only damage the nut thread and/or detrimentally affect the final nut-bolt joint, but also have negative impacts on the further implementation of the attaching procedure, and in particular might lead to damage of the die and the punch guide. The annular burr and/or slug waste can in the case of lightgauge sheet be caused due to the fact that two cutting edges act on the sheet stock, i.e. in most different positions or areas: attention is in this conjunction invited to FIGS. 8, 10 and 11 of DE-OS No. 34 46 978. This implies that in piercing the slug there is a relatively small hole provided in the panel material by coaction between punch and die, so that in the subsequent course of nut introduction the inner cutting edge of said nut performs an additional cutting operation which produces the additional annular waste as aforesaid. Consequently, this waste is produced due to the fact that the punch on one hand the nut on the other hand, in coaction with the die, remove material from the panel in different positions or parts thereof and at different times when thin sheets are involved.

Accordingly, the aim of the present invention is to provide an apparatus of the type earlier defined herein which particularly ensures the attaching of female fastener elements, especially nuts which are preferably self-piercing, in relatively thin sheets also without producing any additional (besides the slup proper), especially annular (secondary) waste. The solution of this problem is based on the idea of avoiding one of the two, preferably annular, cutting and/or piercing areas, i.e. of preventing that cutting and/or piercing takes place on the inside, namely by the punch itself, and instead leaving the slug piercing function to the female fastener element and/or nut in coaction with the die.

In particular, the present invention resides in that a "preceding forming element is provided, preferably in the plunger passage and/or the free bore, which is passed through the female fastener element in the course of an attaching operation. The term "preceding" as used in this conjunction shall not necessarily mean a mechanically separate arrangement and hence a separately controlled movement of said forming element relative to the remaining components of the plunger/punch assembly, but the position of the forming element relative to the female fastener element and/or nut on one hand and to the punch and/or plunger on the other hand, with which said forming element may also be provided in just one piece. The importance of the effect of the "preceding" former is much more than of a shaping influence on the relevant sheet area in each case while and/or before the slug is pierced from the panel: the term "preceding" hence defines the position that the shaping or forming element takes relative to the female fastener element in the course of the piercing operation.

As earlier mentioned, the said former may also be provided in one piece with the punch so that one modification of the present invention resides in that the free end face of the punch facing the panel is provided with a shaping projection. This design of the punch ensures that the later pierced slug area is initially shaped in such a way that subsequently it is only the nut that still cuts in coaction with the die, while the punch takes care of ejecting the slug in that case. The coaction between these elements is preferably controlled such that by the time the maximum punch diameter is received into the die the nut has already completed its piercing operation by its inner cutting edge, i.e. via a cup-shaped portion of the panel material as preshaped by the former.

The forming element projection is preferably in the shape of a rounded cone or a spherical cap, which shapes ensures that rupturing or breaking of the sheet material in undesirable positions is definitely prevented in the course of the shaping operation. They moreover cause slug deformation into a cup-like configuration which, as will be evident more clearly from the following description, will facilitate slug disposal and will permit stacking in a space-saving way. Accordingly, this deformation or shaping provides an optimal solution to the further problem that, due to the solution achieved according to the present invention, i.e. that the nut is performing the cut, the slug has an outer diameter which is distinctly greater than the inner diameter of the die. The cup-shaped slug can now readily pass through this inner die diameter.

The axial extension of the forming element and consequently the degree of "lead", can be easily adapted to give conditions, in which conjunction a plurality of different shapes will provide a plurality of possibilities. It is for instance possible to dispose the spherical cup on a truncated cone at the free punch end, in which case cap and cone are preferably made in one piece.

Optimal deformation of the sheet area that forms the future slug while simultaneously achieving one single cutting and/or piercing line with absolute dependability is accomplished in that the greatest diameter of the former projection and/or truncated cone is smaller than the outer diameter of the punch shank. Punch and plunger may also be in one piece for specific applications. improved performance of the shaping operation can moreover be ensured via the shape of the die unit which is provided with an annular cavity on its working surface to establish the nut-panel joint as in detail explained in the DE-OS No. 34 46 978, and with a central bore, the wall confining said annular cavity outwardly being arranged in the form of a camber profile which in a preferred embodiment is provided as an circular concentric profile with projections.

To prevent the cup-shaped slug from jumping back the die has a self-retaining element acting in the direction towards its working face; this element particularly may be at least one groove in the die bore. A specific embodiment provides for a plurality of barb-shaped concentric grooves in the die bore, the groove wall facing away from the working surface of the die merging into the wall of the die bore under a more acute angle than the one proximal to the die working surface. To ensure proper slug ejection from the die, the die bore widens, preferably beneath the grooves, to at least the greatest groove diameter.

In aggregate, therefore, the scope of the present invention provides a variety of possibilities for adapting the piercing head and/or the plunger/punch assembly therein disposed to given conditions and for carrying the basic idea of the present invention into effect, namely by means of a "preceding" forming element to ensure an unobjectionable piercing cut in a precisely definable position. It goes without saying that, besides providing the forming element and/or punch head and die in different configurations as described in the foregoing, it is also possible to appropriately vary and/or select the axial dimensions of the punch, especially parts and/or areas of its head, to adapt to given conditions.

The invention will now be described in closer detail with reference to the accompanying drawings in which.

As stated earlier, the invention is particularly suitable for carrying into effect the method disclosed in DE-OS No. 34 46 978, U.S. Ser. No. 657,570, filed Oct. 4, 1984, now U.S. Pat. No. 4,610,072, so that the following description relates to the functional performance of the plunger/punch assembly of the present invention when fitted in a piercing head of the type as used for attaching nuts to the so-called "prepierce riveting" method. Such a piercing head is shown in FIG. 1.

Figure 1:
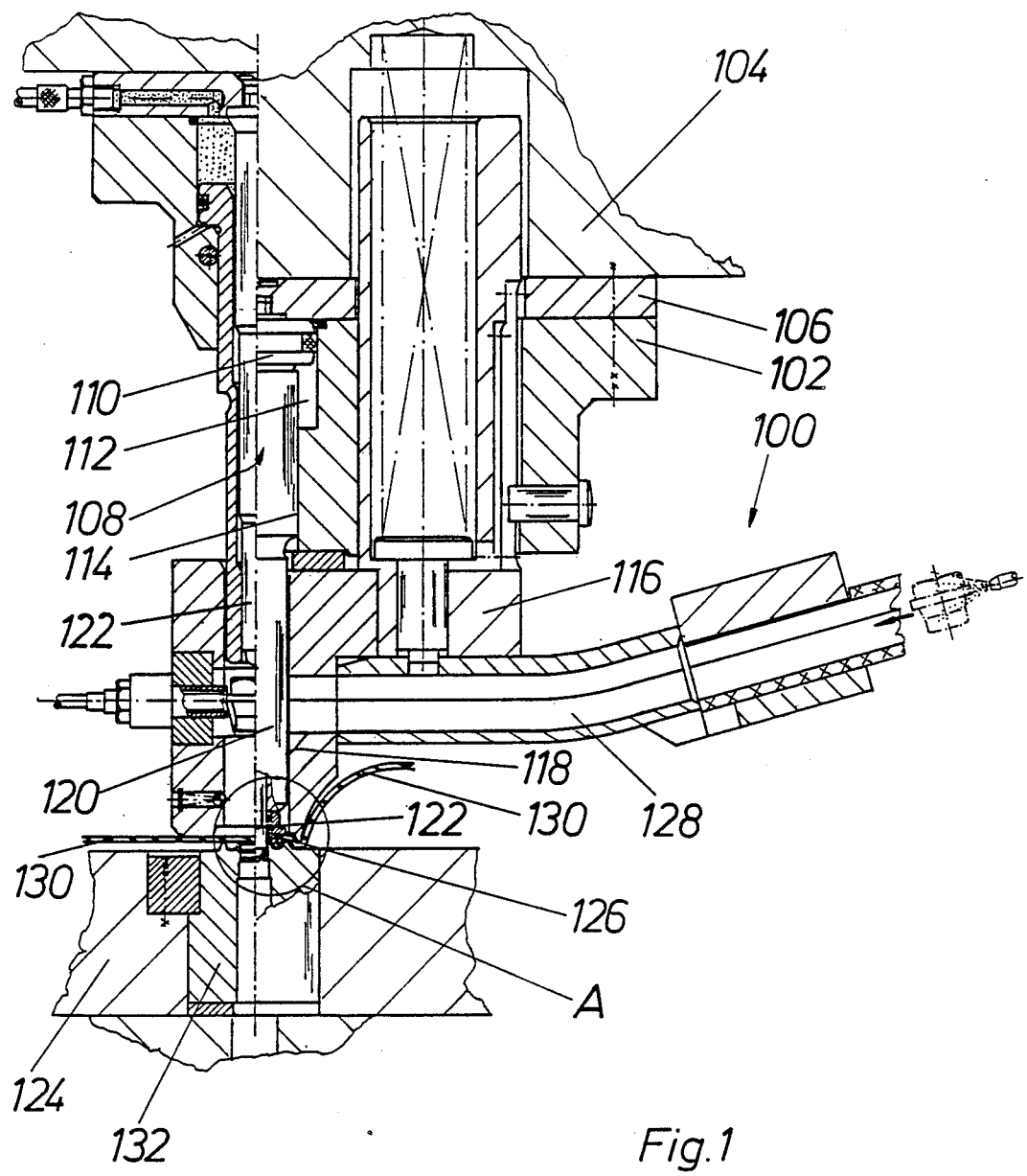
FIG. 1 is a partially cross-sectioned side elevation of an attaching or installation apparatus which shows the punch according to the present invention in two different positions during the attaching operation.

Since the design details of said piercing head shown in FIG. 1 are explained in DE-OS No. 34 46 978, the description that follows is restricted to the essential components of said head which differs from the prior disclosed head in the punch of the present invention. The apparatus according to FIG. 1 is adapted to be secured within a piercing and embossing press having opposed movable plattens or die members. The nuts to be installed in the panel are received in a piercing head assembly 100 having a guide and attachment housing 102 which can be attached to an upper tool mount or plate 104. The head assembly is normally attached to a backing plate 106 which in turn is secured to said upper tool mount or plate 104 by means of bolts, screws or other types of conventional fastening means.

The head assembly 100 includes an annular plunger 108 having a piston head 110 which reciprocates in a chamber 112 and the guide and attachment housing includes a port 114 through which the plunger extends. In the disclosed embodiment, the plunger is cylindrical and the chamber 112 and passage 114 are also cylindrical to support and guide the plunger, which is provided with a corresponding shank. It will be understood, however, that the cross-sectional configuration of the plunger will depend on the particular application for which it is used. The nuts used in the disclosed embodiment are also basically of a cylindrical shape, but their cross-sectional configuration may also depend on their particular application and hence be of any shape other than cylindrical. The head in the nut may be hexagonal or octagonal, for instance, and attention is in this regard also invited to the specific nut configuration in the piercing and riveting assembly according to DE-OS No. 34 46 978.

The piercing head 100 also includes a male die head or nose member 116 which moves relative to the guide and attachment housing 102 during installation of the nut 1, as explained in the DE-OS No. 34 46 978. This male die head or nose member 116 also includes a plunger passage 118 which receives the shank portion 120 of the plunger 108 and the included piercing punch 122 which is disposed within a bore extending axially through the annular plunger 108. The embodiment of the piercing punch 122 as per the present invention will be described and explained with reference to FIGS. 2 to 4.

Disposed opposite the plunger head 116 and on the lower die shoe 124 is a sheet and/or panel 130 to which one nut or several nuts 126 fed into plunger passage 118 through the chute 128 the way as basically described in my copending application Ser. No. 869,507, filed Jun. 2, 1986, which is a divisional application of U.S. Pat. No. 4,610,072, the disclosure of which is incorporated herein by reference. A die 132 in coaxial alignment with said plunger passage 118 is secured to the lower die shoe 124.

Figure 2:
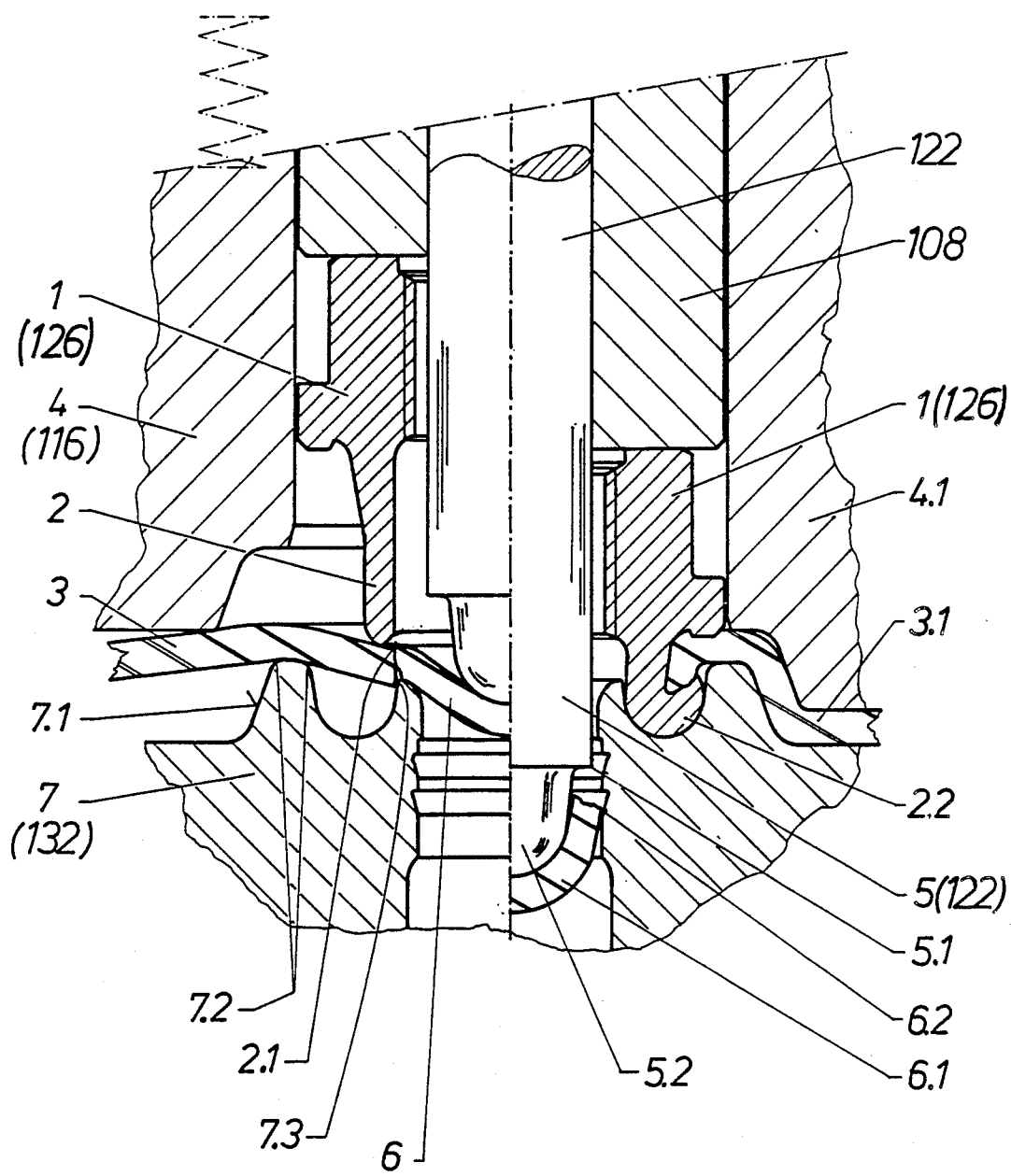
FIG. 2 is a cross-sectional side elevation which shows the plunger/punch assembly of the present invention in two working positions as well and which is drawn to a larger scale than FIG. 1.
Figure 3:
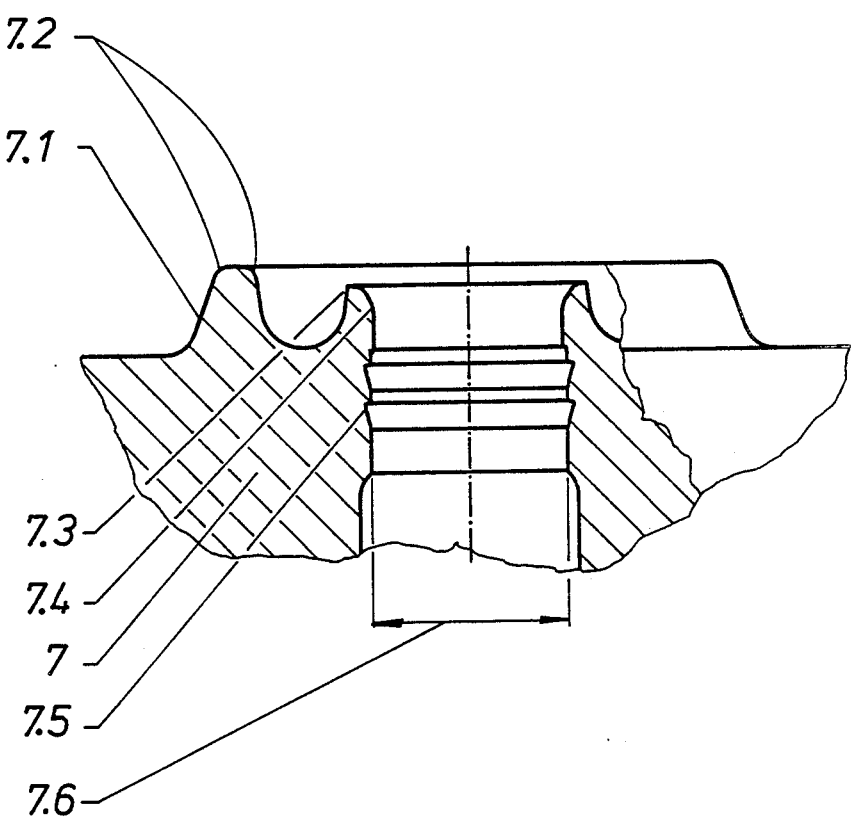
FIG. 3 is a cross-section through part of the type of die to be preferably used.
Figure 4:
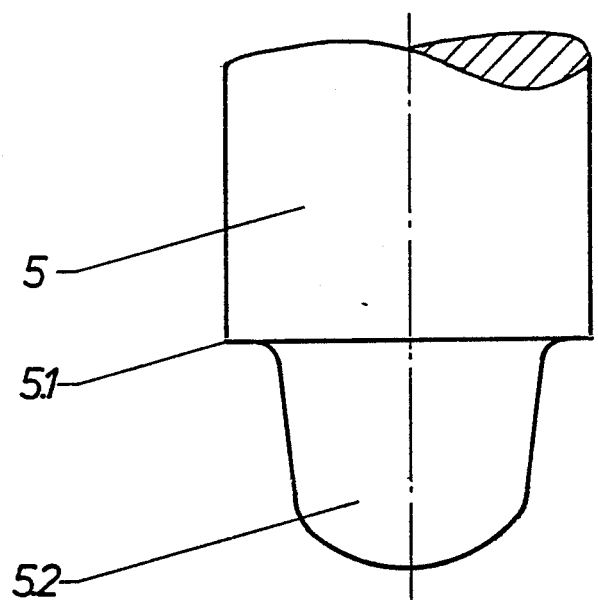
FIG. 4 is a side elevation of a punch head designed in conformity with the present invention.

The invention will now be explained with reference to FIGS. 2 to 4 showing the detail marked A in FIG. 1 to a largerscale; the reference numerals heretofore used were selected with reference to the U.S. Pat. No. 4,610,072, which discloses an apparatus of basically similar design (FIG. 5), while a modified nomenclature has been chosen for the following figures for reasons of clarity and correlation.

FIG. 2 shows two working positions in cross-section, namely on the left a piercing nut 1 which is still undeformed in its piercing and riveting portion 2 while the right half reflects the substantially complete attachment. In this conjunction attention is also invited to the attaching or installing method described in the U.S. Pat. No. 4,610,072. Reference numeral 3 designates the preferably thin panel material while 4 (previous number 116) represents part of the plunger head in which the plunger 5.5 receiving the punch 5 of the present invention (previous number 122) is disposed so as to permit vertical movement. Reference numeral 6 denotes the slug, while the die is designated by 7 (previous number 132).

As mentioned earlier, the problem of additional slug and/or panel material waste due to the action of both the punch and the piercing nut on the sheet occurs during the so-called "prepiece riveting" in light-gauge sheet metal, as for instance represented in FIGS. 8, 10 and 11 of the U.S. Pat. No. 4,610,072. The solution of that problem as per the present invention has been previously defined herein and is clearly understood from the process illustrated in FIG. 2, in which conjunction there is to be mentioned that up to the time the slug sheet region undergoes deformation all of the movements taking place are exactly the same as described in my above-referenced co-pending application and U.S. Pat. No. 4,610,072.

The essential difference resides in the specific punch head design according to the present invention, which is such that in the exemplified embodiment as illustrated it is the punch head itself that carries the "preceding" forming element in the shape of a spherical projection 5.2 which is integral with the punch head and which in the embodiment as shown is of smaller diameter than the punch shank (see also FIG. 4a). After the piercing nut 1 has been fed in the correct position to the piercing head and in the course of its descending movement in a calibrated vertical passage has been fitted placing onto the panel material 3, through the further downward pressure and without deformation of its piercing portion the nut initially ensures that the panel material undergoes deformation to take the shape of a dome or cup, particularly as a result of the fact that the die 7 has a radiused profile with projections 7.1, 7.2 which concentrically surrounds the outer periphery of the die cutting edge 7.3 and in coaction therewith forms the annular cavity which is needed for deformation of the nut piercing portion, said cutting edge 7.3 being of lesser height than the projection profile so that, due to the descending movement of the piercing nut, the sheet is initially deformed into a cup-shaped or domed portion on the die in the way as described.

Punch 5 which also initially moves and which is comparable to the punch 122 of U.S. Pat. No. 4,610,072, has a spherically rounded projection 5.2 formed to its head instead of being provided with a sharp cutting edge extending under a right angle to the punch shank, so that the specific "lead" effect of the present invention is produced. This projection is of smaller diameter than the shank 5.1 of the punch 5.

After the nut has deformed the panel material 3 into sort of a cup or dome in the way as described, the piercing step takes place pursuant to further deformation of the panel material by the preceding punch head (forming element) 5.2 (see left half of the cross-section as per FIG. 2) which, upon piercing of a slug 6 due to coaction of the nut cutting edge 2.1 and the die cutting edge 7.3 in the manner represented in the right half of the cross-sectional view as per FIG. 2, is carried on until the slug 6 has taken the shape of a hat or cup 6.1. This is the form in which the slug can pass through the inner die bore 7.6 (see FIG. 3). During this process of forming the slug into the hat-like configuration as described, the piercing nut 1 keeps on pressing downward against the panel material 3 to form a tubular section from that material and simultaneously from the piercing and riveting portion 2 of the piercing nut a riveting bead 2.2, so that said tubular section of the panel material 3 is surrounded on all sides.

At the same time and due to the specific configuration of the die 7 with its concentric projection profile 7.1, 7.2 a cavity is provided in the panel to ensure that the piercing nut, as punched in and concurrently riveted, is slightly set back from the adjacent panel material 3. In this process, the punch head 4 simultaneously serves as a holding down and shaping element so that finally the deformation as represented in the right half of the cross-sectional view as per FIG. 2 of the sheet or panel 3.1 is produced.

It is due to the preceding or leading panel forming portion or element, i.e. in the exemplified embodiment as here illustrated and described the spherical projection 5.2, that the slug 6 as severed form the panel stock 3 by the cutting edge 7.3 of die 7 in coaction with the piercing portion 2 of nut 1 does not undergo any further cutting and/or piercing, so that there is no additional material waste involved: on the contrary, the inclined or curved portion 7.4 (See FIG. 3) in coaction with the spherical projection 5.2 transforms the slug into the cup shape earlier described and illustrated in FIG. 2. To make sure that on completion of the attaching or installing operation, i.e. the process of fixing the nut to the panel, in the bottom deadcenter zone the slug thus deformed 6.1 is not again pulled up as the stem with projection 5.2 is again raised, concentric grooves 7.5 are provided in the die whose diameters are slightly larger than the inner diameter 7.6 of the die: said grooves 7.5 are disposed below the inclined or curved portion 7.4 of the die and in coaction with the expansion tendency of slug 6, especially in area 6.2 thereof, prevent that the slug is again lifted during backtravel of the punch due to the slug edges 6.2 becoming entangled or hooked up with the grooves (also see FIG. 3). In the embodiment as shown, the grooves are asymmetrically disposed such that the groove wall distant from the die working face merges into the die passage wall under a more acute angle than does the groove wall proximal to said working face, with the result that on the one hand it is easier to shift the slug downward and on the other hand a stronger resistance is produced in case an upward force should be acting on the slug.

I claim:

1. A method of attaching a female element to a panel, said female element including a body portion having a bore therethrough and a generally annular piercing and riveting portion extending from said body portion in general coaxial alignment with said body portion bore, said piercing and riveting portion including a free end and a piercing surface adjacent said free end, said method including the following steps:

(a) supporting a panel on a die member, said die member including an annular die cavity surrounding a projecting annular die portion, said die portion surrounding a central die bore and having a die cutting edge adjacent its upper surface and located at the inner edge of said annular die cavity, and a panel supporting surface generally surrounding said annular die cavity supporting said panel, said upper surface of said annular die portion being spaced below the plane of said panel supporting surface;

(b) biasing said annular piercing and riveting portion free end against said panel with said piercing and riveting portion piercing surface in general coaxial alignment with said die cutting edge;

(c) driving the free end of a punch having a rounded end surface through said female element bore and said annular piercing and riveting portion thereby doming a first panel portion into said central die bore;

(d) driving said annular piercing and riveting portion piercing surface against said panel and said die cutting edge thereby piercing said domed first panel portion from said panel forming a pierced panel opening and a panel slug, and said punch driving said domed first panel portion slug into said central die bore; and (e) continuing to drive said female element piercing and riveting portion free end against said panel adjacent the pierced edge of said panel, through said pierced panel opening into said annular die cavity, deforming said piercing and riveting portion free end and said panel, forming a mechanical interlock between said female element piercing and riveting portion and said panel.

2. The method of attaching a female element to a panel as defined in claim 1, wherein said die cavity includes a concave annular bottom surface which is hemispherical in cross-section and said method including deforming said annular piercing and riveting portion radially outwardly against said die cavity bottom surface forming a U-shaped portion in cross-section and deforming said panel adjacent the pierced edge in said U-shaped female element piercing and riveting portion in mechanical interlocking relation.

3. The method of attaching a female element to a panel as defined in claim 1, including doming said first panel portion into a U-shape in cross-section and releasably retaining said pierced domed panel portion slug in said central die bore.

4. An installation apparatus for attaching a female element to a panel, said female element having a body portion, a generally annular piercing and riveting portion extending from said body portion and a bore extending through said body portion generally coaxially aligned with the opening through said annular piercing and riveting portion, said annular piercing and riveting portion having a free end and a piercing surface adjacent said free end, said installation apparatus including a plunger having an annular end portion adapted to engage said female element body portion, a punch telescopically received in said plunger and reciprocal through said annular end portion and said female element, said punch having a rounded free end, and a die member having an annular die cavity configured to receive said female element piercing and riveting portion free end surrounding a projecting annular die portion surrounding a central die bore, said annular die portion having a die cutting edge adjacent its upper surface and located at the inner edge of said annular die cavity and said die member having a panel supporting surface generally surrounding said annular die cavity, said upper surface of said annular die portion being spaced below the plane of said panel supporting surface, said plunger first biasing said female element against a panel supported on said die member panel supporting surface thereby deforming said panel into said die cavity against said annular die portion upper surface preloading said panel, the rounded free end of said punch then doming the panel portion overlying said die central bore, said plunger then driving said piercing and riveting portion against said panel to pierce said domed panel portion from the remainder of said panel and said punch telescopically receivable in said central die bore to drive the pierced panel slug into said central die bore and continuing to drive said female element piercing and riveting portion free end against said panel adjacent the pierced edge of said panel, through said pierced panel opening into said annular die cavity, deforming said piercing and riveting portion free end and said panel, forming a mechanical interlock between said female element piercing and riveting portion and said panel.

5. The installation apparatus defined in claim 4, characterized in that said upper surface of said annular die portion includes a relatively sharp outer cutting edge which mates with the piercing surface of said female element annular piercing and riveting portion to pierce said panel and said annular die portion upper surface including an inner rounded surface which extends into said central die bore and which supports the panel as said panel is domed by said punch rounded free end prior to piercing.

6. The installation apparatus defined in claim 5, wherein said central die bore includes an upwardly outwardly angled conical groove which releasably retains said pierced domed panel slug against upward movement out of said central die bore following installation of said female element to said panel.

7. The installation apparatus defined in claim 4, characterized in that said annular die cavity includes a concave annular bottom surface which is generally hemispherical in cross-section which deforms the free end of said annular piercing and riveting portion radially outwardly into a U-shaped configuration in cross-section as said annular piercing and riveting portion is driven through the pierced panel opening.

8. The installation apparatus defined in claim 4, characterized in that said apparatus includes an installation head and said die member, said installation head having a plunger passage which telescopically receives said plunger and punch, said passage including an enlarged opening which receives said die member panel supporting surface.

9. The installation apparatus defined in claim 8, characterized in that said die member includes a projecting annular panel supporting portion surrounding said annular die cavity having a top surface defining said panel supporting surface, the inner and outer surfaces of said annular panel supporting die portion being rounded to support said panel during installation of said female element and said enlarged opening of said installation head passage including an inner surface mating with the outer surface of said projecting panel supporting portion, said panel supporting portion deforming said panel into a generally L-shape in cross-section and providing a generally flush mounting of said female element in said panel.

10. The installation apparatus defined in claim 4, characterized in that said punch includes a generally cylindrical portion and said rounded free end including a spherical end portion which blends into a side surface having a diameter which is less than the diameter of said cylindrical portion, said hemispherical portion doming said panel portion prior to piercing said panel.

* * * * *